US005681024A

United States Patent [19]

Lisec et al.

[11] Patent Number: 5,681,024

[45] Date of Patent: Oct. 28, 1997

[54] MICROVALVE

[75] Inventors: Thomas Lisec; Hans-Joachim Quenzer; Bernd Wagner, all of Berlin, Germany

[73] Assignee: Fraunhofer-Gesellschaft zur Förderung der angerwanden Forschung e.V., Munich, Germany

[21] Appl. No.: 556,911

[22] PCT Filed: May 21, 1994

[86] PCT No.: PCT/DE94/00599

§ 371 Date: Nov. 20, 1995

§ 102(e) Date: Nov. 20, 1995

[87] PCT Pub. No.: WO94/28318

PCT Pub. Date: Dec. 8, 1994

[30] Foreign Application Priority Data

May 21, 1993 [DE] Germany .......................... 43 17 676.3

[51] Int. Cl.[6] .................................................. F16K 31/70

[52] U.S. Cl. ............................................. 251/11; 251/368

[58] Field of Search ...................................... 251/11, 368

[56] References Cited

U.S. PATENT DOCUMENTS

| | | | |
|---|---|---|---|
| 4,628,576 | 12/1986 | Giachino et al. | 29/157.1 R |
| 4,756,508 | 7/1988 | Giachino et al. | 251/331 |
| 4,770,740 | 9/1988 | Tsuzuki et al. | 156/644 |
| 5,029,805 | 7/1991 | Albarda et al. | 251/11 |
| 5,058,856 | 10/1991 | Gordon et al. | 251/11 |
| 5,065,978 | 11/1991 | Albarda et al. | 251/129 |
| 5,069,419 | 12/1991 | Jerman | 251/11 |
| 5,142,781 | 9/1992 | Metner et al. | 29/890.124 |
| 5,161,774 | 11/1992 | Engeldorf et al. | 251/11 |
| 5,238,223 | 8/1993 | Metner et al. | 251/368 |
| 5,323,999 | 6/1994 | Bonnie et al. | 251/11 |
| 5,333,831 | 8/1994 | Barth et al. | 251/11 |

FOREIGN PATENT DOCUMENTS

| | | |
|---|---|---|
| 0208386 | 1/1987 | European Pat. Off. . |
| 0512521 | 5/1992 | European Pat. Off. . |
| 3919876 | 12/1990 | Germany . |
| WO 9101464 | 2/1991 | WIPO . |

*Primary Examiner*—A. Michael Chambers
*Attorney, Agent, or Firm*—Karl Hormann

[57] ABSTRACT

The present invention relates to a microvalve usable primarily as a pilot valve in pneumatic controls. The prior art solenoid valves used in this field can be miniaturized only at considerably high cost. The microvalve of the invention consists of a first part (1), on the pressure side, with a diaphragm structure (3) as the movable closing component and a second part (2) with an outlet aperture (7) and a seat (5). The diaphragm structure has heating elements and is coated on one side with a material with differing coefficients of heat expansion, in such a way that heating causes the diaphragm to bend against the pressure applied on it. At least one of the two parts has a recess (6) of defined depth arranged in such a way that with the valve closed hollows are formed which are heated by the heating elements. The microvalve described can economically produced with semiconductor technology means and has improved switching properties on account of its combined thermo-mechanical/thermo-pneumatic method of operation.

14 Claims, 1 Drawing Sheet

MICROVALVE

FIELD OF TECHNOLOGY

Figure 1:
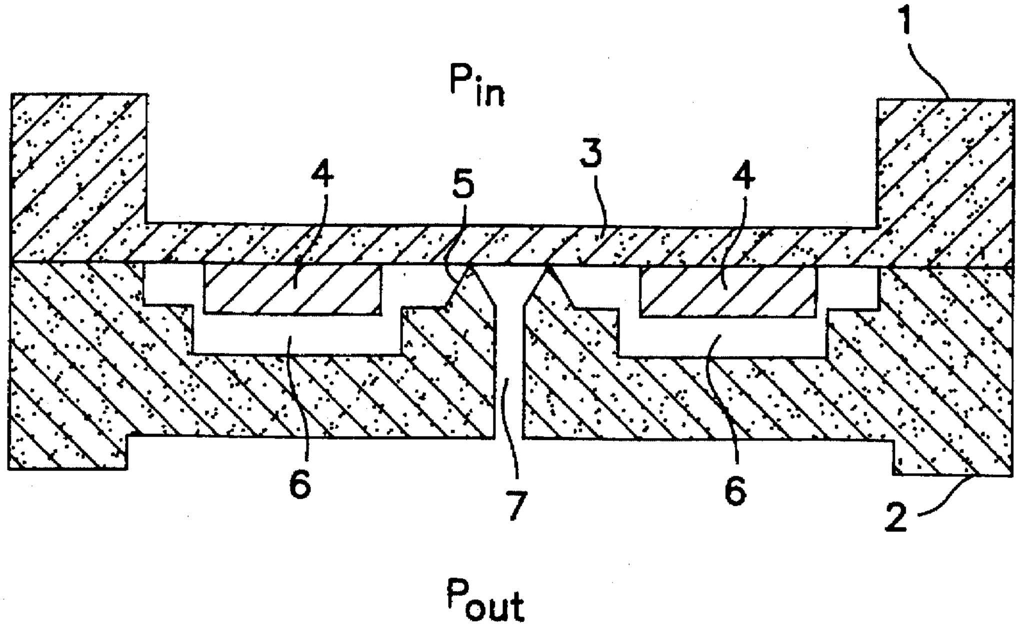

The present invention relates to a microvalve which may be used in pneumatic applications, for instance.

Pneumatic controls are widely used in many fields of technology, for they are characterized by high longevity, operational safety, and large forces. An electro-mechanical transducer (actuating element) actuated by an electrical signal, acts directly or by way of several pressure stages on the actual valve stage (control element) which, in turn, manipulates a predetermined parameter (pressure, rate of flow) in a desired manner.

STATE OF THE ART

In pneumatics, the major control elements used for main or master stages are primarily cylindrical sluice or slide gate valves and, for directly actuated valves or pilot valves, cylindrical seat valves. The solenoid has found wide acceptance as an actuator, for its kind of drive is characterized by high operative efficiency and simple structure. The dimensions of a conventional solenoid valve made of plastic components are about 25×25×40 mm; such a valve operates at pressures up to 8 bar and, when energized, requires about 2.5 W.

For reasons of reducing costs, lower materials consumption, increased flexibility and improved switching characteristics, the trend towards miniaturization may also be observed for certain applications in the field of pneumatics. The size of pneumatic microvalves is increasingly determined by the dimensions of the solenoid, the size of the coil of which may only be reduced at significant increases in costs at unavoidably lower efficiency. Miniature solenoid valves (10×10×15 $mm^1$) made by precision engineering techniques are at least five times more expensive than conventional miniature valves.

A silicon valve made by micro-structure technology for controlling the flow rate of a liquid is known from European Patent 208,386. The valve consists of a first planar portion having an outlet opening and a second portion having a planar surface which, for opening and closing the outlet opening, is moveable relative thereto. For moving the closure member, an external force is applied to it, for instance by a plunger. The entire structure required for this valve is very complex.

Other actuators for moving a diaphragm closure member in microvalves are known from German Patent 39 19 876. In this context, piezo-electrically and thermo-electrically operating coatings of the diaphragm and electro-static and thermo-fluidic actuation are to be especially mentioned. Particularly during the opening phase of a valve against abutting pressure, a greater force is initially necessary than during the ensuing opening operation. This is a requirement which cannot be met by the actuators mentioned supra.

Furthermore, piezo-electric and electro-static microvalves cannot satisfy the operational conditions demanded by pneumatics. In order to switch at the high pressures (1–7 bar) prevalent in pneumatics, very high control voltages would be required. Since the strokes attainable with such valves are small, the valve openings would have to be large to provide the requisite flow rate (1–30 l/min). Problems would arise with contaminations (oil, water) by the operating medium (oil-contaminated moist pressurized air). Furthermore, icing may occur. This is less critical with thermal valves as their closure diaphragm becomes very hot. The attainable stroke is larger.

Thermo-fluidic actuation is disadvantageous in that, without additional annoying means, the cooling process proceeds very slowly (low dynamics).

From European Patent 0,512,521 a microvalve is known which is made of a micro-structurable material and consists of a first part positioned at the pressure side and having, as a closure member, a diaphragm structure, and of a second part connected to the first part and provided with at least one output opening and at least one valve seat, at least one of the two parts being provided with one or more recesses of defined depth. At one surface, the diaphragm structure is coated in such a manner with a material having an elongation coefficient different from that of the diaphragm material, that, when heated, the diaphragm structure is deflected in the direction of the abutting pressure. For this purpose, the diaphragm structure is provided with one or more heating elements. The operational principle of this microvalve is based upon the thermo-mechanical effect resulting from the different thermic elongation coefficients of the diaphragm material and its coating.

This operation is disadvantageous in that the high initial forces required in pneumatic controls during opening of the valve can be only insufficiently developed.

PRESENTATION OF THE INVENTION

It is the task of the present invention to provide a microvalve of the kind referred to which is suitable for industrial pneumatic controls, which may be fabricated in a cost-efficient manner by means known in semi-conductor technology, and which has improved switching characteristics.

The task is solved in accordance with the invention by the microvalve consisting of two parts.

The first part which is positioned at the higher pressure ($p_{in}$) side (on the pressure side) is provided with a diaphragm structure coated at one surface with a material possessing a coefficient of elongation different from that of the material from which the diaphragm is made. The difference in the coefficients of elongation of the diaphragm material and of the coating material, as well as the spatial arrangement of the coating on the diaphragm, determine the direction of deflection of the diaphragm structure. The diaphragm structure may be coated completely or at defined areas only. It is, however, important that the coating be applied in such a way that as the diaphragm structure is heated, it will deflect in the direction of the abutting pressure ($p_{in}$). Moreover, the diaphragm structure is provided with one or more heating elements.

The second part is connected to the first part at its side facing the lower pressure ($p_{out}$). It is provided with one or more outlet openings and valve seats associated therewith.

In addition, either the closure member of the first part or substrate areas of the second part, or both parts, are provided with one or more recesses of defined depth, all recesses being positioned to be completely covered by the corresponding other part when the valve is closed. Thus, enclosed cavities are formed in which heating elements are provided. In the present context, enclosed cavities are intended to mean cavities the margins of the recesses of which have gaps of a few um.

The heating elements thus heat up the volume of gas or liquid within the recesses. As regards the arrangement of the recesses, it is important that, with the valve closed, they form an enclosed volume of liquid or gas which may be heated quickly by the heating elements. Preferably, the depth of the recesses is at most 40 μm.

The effective principle of operation of the microvalve in accordance with the invention is a combination of thermo-mechanics and thermo-pneumatics. When deenergized, the valve is closed. As the diaphragm is heated, a force is built up (thermo-mechanical effect) as a result of the thermic expansion of the diaphragm, which deflects the diaphragm in the direction of the higher pressure $p_{in}$. Depending upon its thickness, the coating may act in support of this force (bi-metal effect), or it may simply act to define the direction of the deflection of the diaphragm. At the same time, the quantity of liquid or gas (e.g. air) within the recesses below the diaphragm is heated. As this fluid can escape by narrow gaps only, an overpressure is developed within the recesses. This results in an additional thermo-pneumatic force acting briefly upon the diaphragm. Thus, the valve can be opened against higher pressures than would be possible with a purely thermo-mechanically generated force. Furthermore, compared to a purely thermo-mechanical drive, the speed at which the valve opens is significantly increased. Because of the improved heat utilization, the efficiency of the valve is enhanced as well. As the diaphragm moves upwardly, the thermo-pneumatic effect is reduced; that is to say, when the valve is open, only thermo-mechanical forces are active. A further improvement results from the full pressure difference ($p_{in}>>p_{out}$) being effectire only at the initial instant of the valve opening. For instance, a control chamber is to be filled with pressurized air so as to actuate a larger valve stage. Accordingly, the switching operation terminates once equilibrium pressure ($pl_{in}=p_{out}$) has been reached. Thereafter, only the elastic force of the diaphragm and pressure drops possible as a result of leakage need be compensated. In this state, the supply of energy may be significantly reduced as compared to conventional solenoid valves. Several heating elements may be provided to adjust the heating power and, hence, the thermo-mechanical force, to given requirements.

The micro-mechanical valves here described are closed by turning off the heating elements. This operation is accelerated significantly by "venting" the control chamber (again $p_{in}>>p_{out}$), as by, for instance, a second microvalve, as the pressure abutting above (at the $p_{in}$ side) simply pushes the diaphragm down (to the $p_{out}$ side).

As the micro-mechanical valves may be fabricated in a manner similar to IC's, they are significantly more advantageous in terms of cost than are miniature solenoid valves. Furthermore, the size of a microvalve, even including its housing, is no more than one-tenth the size of a conventional miniature valve.

The preferred micro-structurable material used is silicon which, because of its physical characteristics, is particularly well suited for the fabrication of microvalves. For instance, the two parts of the microvalve may be chips connected by silicon bonding or adhesion. Moreover, elements which may be fabricated very economically in large quantities by silicon technology.

The preferred coating material of the diaphragm structure is a metal. Compared to micro-structurable materials, such as, for instance, silicon, metals possess relatively large thermal elongation coefficients. The metal coating may, for instance, be applied as shown in the embodiment in order to provide the deflection in the direction of the abutting pressure ($p_{in}$). The coating may be applied during manufacture by sputtering, vapor deposition, or galvanically.

A silicon dioxide ($SiO_2$) or silicon nitride ($Si_3N_4$) coating applied to the surface of the silicon diaphragm facing the lower pressure ($p_{out}$ side), has been found to be particularly advantageous. With diaphragm thicknesses up to 12 μm, the thickness of the coating may be up to 500 nanometers. The diaphragm expands as it is heated by the heating elements. As the diaphragm remains cold at the initial instant, the silicon structure will buckle because of the elongation of the silicon itself. The $SiO_2$ or $Si_3N_4$ on the lower pressure $p_{out}$ surface causes the diaphragm to deflect exclusively in the direction of the abutting high pressure $p_{in}$, as these materials have a significantly lower elongation coefficient than monocrystalline silicon.

The major advantage of the coating material resides in its low energy consumption compared to metal coatings. A metal coating would act as a thermal conductor, that is to say, the dissipation of heat to the chip by way of the diaphragm is very large. Therefore, at a similar heating power, a diaphragm structure without metal agents reaches a significantly higher temperature. In the present context, temperature is the variable which determines the strength of the thermo-mechanical effect.

Valves provided with silicon dioxide or silicon nitride coatings operate at low heating power and have better dynamic properties (switching times in the range of a few msec) than valves provided with metal coatings. In the embodiment, the coating serves only to influence the direction of the deflection, whereas the force directed against the outer pressure is generated by the thermal elongation of the silicon diaphragm itself.

A preferred embodiment of the microvalve in accordance with the invention provides for heating elements which are implanted conductive strips or polysilicon strips. These strips may be applied by semi-conductor technology processes.

Preferably, the diaphragm resembles a bridge (i.e. it is a strip clampingly retained at both sides) or a cross allowing the pressure medium to pass as unimpededly as possible when the valve is opened.

By controlling the energy supply and, hence, the generation of heat the total energy consumption of a pneumatic control comprising microvalves may be significantly reduced compared to conventional valves. As stated supra, a large generation of heat is required only during the initial opening moment.

The preferred field of use of the microvalve in accordance with the invention is as a pilot valve in pneumatic controls.

Embodiment

An embodiment of the microvalve defined in the claims will now be explained with reference to the drawing.

FIG. 1 is a schematic presentation of a possible embodiment of the microvalve in accordance with the invention.

The microvalve consists of two silicon chips 1 and 2, which are connected in a conventional manner by silicon bonding at the waver plane. The upper chip 1 (at the pressure side) includes a moveable closure member 3 formed as a diaphragm structure made by anisotropic etching (it may, for instance, be shaped like a bridge or cross). The diaphragm is provided with heating elements (for instance, implanted conductive strips or polysilicon strips) and is selectively coated with a metal 4 (for instance, Al or Au, by sputtering, vapor deposition or galvanically) on its surface provided with recesses. For reasons of insulation, a further insulating layer (for instance, thermic $SiO_2$) is provided between the metal coating and the heating elements. The lower chip 2 is provided with an outlet opening 7, the anisotropically etched valve seat 5 and several recesses of defined depth 6, which may be made by isotropic as well as anisotropic etching. The recesses have a maximum dimension of 400×600×40 um and are positioned to be covered by the diaphragm structure.

A second microvalve in accordance with the invention may be applied for venting the control chamber.

What is claimed is:

1. A microvalve, comprising:

first and second housing sections made of microstructurable material and sealingly connected to each other along marginal portions, at least one of said housing sections defining at least one recess in a surface facing the other of said housing sections to define a substantially enclosed fluid chamber, one of said housing sections being provided with an opening leading into said fluid chamber and surrounded by a annular protrusion extending into said fluid chamber and defining valve seat means, the other of said housing sections comprising flexible diaphragm means movable by selective heat energization into and out of engagement with said valve seat means, said diaphragm means being made of a material having a first coefficient of thermal expansion and being coated with a material having a coefficient of thermal expansion different from said first coefficient, said other housing section being further provided with selectively energizable heating means disposed in said fluid chamber for assisting in the movement of said diaphragm means by heating and expanding fluid in said chamber.

2. The microvalve of claim 1 wherein said recess has a maximum depth of 40 μm.

3. The microvalve of claim 2, wherein the microstructurable material is silicon.

4. The microvalve of claim 3, wherein the coating material of the diaphragm means is $SiO_2$ and the coating is applied to a surface of the diaphragm means facing said one housing section.

5. The microvalve of claim 3, wherein the first and second housing sections of the microvalve are two chips connected by adhesion.

6. The microvalve of claim 3, wherein the coating material of the diaphragm means is $Si_3N_4$ and the coating is applied to a surface of the diaphragm means facing said one housing section.

7. The microvalve of claim 3, wherein said first and second housing sections of the microvalve are two chips connected by silicon bonding.

8. The microvalve of claim 7, wherein the heating means comprises implanted conductive strips.

9. The microvalve of claim 7, the heat energization is controllable.

10. The microvalve of claim 7, wherein the diaphragm means in cross-section is configured is a bridge.

11. The microvalve of claim 7, wherein the heating means comprises polysilicon strips.

12. The microvalve of claim 7, wherein the diaphragm means in cross-section is configured as a cross.

13. The microvalve of claim 7, wherein the coating material of the diaphragm means is a metal.

14. The microvalve of claim 1, wherein it comprises a pilot valve for use in pneumatic controls.

* * * * *